(12) United States Patent
Schreiber et al.

(10) Patent No.: US 7,505,151 B2
(45) Date of Patent: Mar. 17, 2009

(54) ARRANGEMENT FOR THE OPTICAL DISTANCE DETERMINATION OF A REFLECTING SURFACE

(75) Inventors: Peter Schreiber, Jena (DE); Sergey Kudaev, Jena (DE); Manfred Hibbing, Wedemark (DE); Andre Michaelis, Wedemark (DE); Wolfgang Niehoff, Wedemark (DE); Vladimir Gorelik, Hannover (DE); Ruth Weichenhain-Schriever, Goettingen (DE); Juergen Ihlemann, Goettingen (DE)

(73) Assignees: Fraunhofer-Gesellschaft zur Foerderung der Angewandten Forschung e.V., Munich (DE); Sennheiser Electronic GmbH & Co. KG., Wedemark (DE)

( * ) Notice: Subject to any disclaimer, the term of this patent is extended or adjusted under 35 U.S.C. 154(b) by 56 days.

(21) Appl. No.: 10/552,715

(22) PCT Filed: Apr. 2, 2004

(86) PCT No.: PCT/DE2004/000745
§ 371 (c)(1),
(2), (4) Date: Jun. 30, 2006

(87) PCT Pub. No.: WO2004/092692
PCT Pub. Date: Oct. 28, 2004

(65) Prior Publication Data
US 2007/0052975 A1 Mar. 8, 2007

(30) Foreign Application Priority Data
Apr. 7, 2003 (DE) .............................. 103 16 924
May 23, 2003 (DE) .............................. 103 23 336

(51) Int. Cl.
*G01B 11/14* (2006.01)
*G01N 21/55* (2006.01)

(52) U.S. Cl. .................................. 356/614; 356/445

(58) Field of Classification Search ...................... None
See application file for complete search history.

(56) References Cited

U.S. PATENT DOCUMENTS

| 3,940,608 | A |   | 2/1976  | Kissinger et al. |        |
|-----------|---|---|---------|------------------|--------|
| 4,411,940 | A |   | 10/1983 | Derkacs et al.   |        |
| 5,073,027 | A |   | 12/1991 | Krohn et al.     |        |
| 5,146,515 | A | * | 9/1992  | Chao et al.      | 385/35 |
| 5,239,178 | A |   | 8/1993  | Derdinger et al. |        |
| 5,543,919 | A | * | 8/1996  | Mumola           | 356/632|

FOREIGN PATENT DOCUMENTS

DE 40 35 799 A1 5/1992

OTHER PUBLICATIONS

Chitnis et al., Optical Fiber Sensor for Vibration Amplitude Measurement, Journal of Lightwave Technology, Apr. 1989, pp. 687-691, No. 4, New York, US.

* cited by examiner

*Primary Examiner*—Michael P Stafira
(74) *Attorney, Agent, or Firm*—Novak Druce + Quigg LLP (57) ABSTRACT

The invention relates to an arrangement for optically determining the distance of a reflecting surface that can be used, in particular, for determining slight variations in distance such as can frequently occur in vibrating systems. Such an arrangement can also be used as optical microphone or hydrophone. The arrangement according to the invention is designed in this case such that light from a light source is directed onto a reflecting surface via a first optical fiber, and light reflected therefrom is directed onto at least one statically arranged optical detector via the first optical fiber or at least one further optical fiber. An optical element collimating in the direction of the reflecting surface is arranged between the reflecting surface and the one or more optical fibers. Furthermore, at least two optical elements focusing in the direction of the reflecting surface and whose optical axes are aligned parallel to the optical axis of the collimating optical element and are arranged at constant spacings from one another are arranged above the reflecting surface.

21 Claims, 12 Drawing Sheets

ARRANGEMENT FOR THE OPTICAL DISTANCE DETERMINATION OF A REFLECTING SURFACE

The invention relates to an arrangement for optically determining the distance of a reflecting surface, which can, in particular, advantageously be set for determining slight variations in distance such as frequently occur with vibrating systems. It can be used as optical microphone or hydrophone.

Various measuring principles are known for this purpose in which the coupling factor between two optical fibers, the phase modulation or the polarization of light in varied form can be evaluated.

U.S. Pat. No. 3,940,608 and U.S. Pat. No. 5,073,027 disclose solutions in which light from a light source is directed onto a reflecting surface via at least one optical fiber, and light retroreflected from this reflecting surface is directed onto an optical detector likewise via the one or a further optical fiber, and the respective intensity of the detected light is used as a measure of the respective distance of the reflecting surface.

However, with these known solutions the light in each case directed onto the reflecting surface is focused by means of optical elements in this direction, and so a more or less large light spot is to be recorded, and this spot can be imaged completely on the optical detector in the most expedient case depending on the respective distance of the reflecting surface.

When the distances of the respective reflecting surfaces vary, there is a corresponding variation in the size of the image, and this results in interplay with the vignette at the aperture of the optical fiber for the retroreflected light in a corresponding change in the light intensity that can be detected with the aid of the optical detector and which can be evaluated as a measurement signal value in a fashion proportional to the respective distance or a change in distance that has occurred.

Thus, in particular, a solution is described in U.S. Pat. No. 5,073,027 in which only one optical fiber is used for radiating the respective reflecting surface and for guiding light reflected therefrom to an optical detector.

The aim in this case is to provide one possibility with the aid of the teaching described there by aiming to achieve an adaptation to different distance measuring ranges with an increased measuring sensitivity in each case by varying distances between the end face of the optical fiber, from which light is coupled out and reflected light is coupled in, and focusing optical elements.

In the solution described in U.S. Pat. No. 3,940,608, a number of optical fibers are used to irradiate the reflecting surface, and also for reflected radiation that is to be directed onto one or more detector(s), the same optical elements being interposed both for the irradiation and for the reflected light.

By selecting the respective linear magnification, it is therefore possible to undertake to influence the gradient of the light intensities that can be detected by changes in distance occurring, doing so with specific limits with the aid of optical detectors.

It holds here that as light intensities vary correspondingly the gradient becomes larger the smaller the respective linear magnification which has been selected.

However, here the divergence of the light beam that is directed onto the reflecting surface is an important measure used to limit the achievable gradient of the varying light intensity.

Since the beam divergence in the object space and in the image space, and the object size and image size can change in contrary fashion with imaging optics, it is, however, impossible for the linear magnification of appropriate optics to be reduced at will, since the divergence of the light beam in the image space would then assume excessively high values.

It is therefore an object of the invention to provide an optical arrangement with the aid of which it is possible to determine distances from reflecting surfaces with increased measuring sensitivity, and/or even to detect small variations in distance with high sensitivity.

This object is achieved according to the invention with the aid of an arrangement that has the features of claim 1. Advantageous forms of refinement and developments of the invention can be achieved with the aid of the features designated in the dependent claims.

The arrangement according to the invention for optically determining the distance of reflecting surfaces likewise uses at least one optical fiber via which light from a light source is directed onto a reflecting surface, and light consequently reflected from this surface can be imaged on at least one optical detector via this or at least one further optical fiber. The measurable light intensity varying as a function of changing distances is used with the aid of the optical detector as a measure for the respective distance, in a way similar to the solutions from the prior art.

According to the invention, the divergent light that exits from the first optical fiber is directed by means of a collimating optical element as parallel light beams in the direction of the respective reflecting surface, there being arranged between a collimating optical element and the reflecting surface at least two optical elements that focus in the direction of the reflecting surface and whose optical axes are aligned parallel to the optical axis of the collimating optical element. These at least two focusing optical elements in this case have a constant distance from one another such that the spaces of their optical axes are likewise kept constant even given a higher number of focusing optical elements.

Thus, for example, it is advantageous when there is present a number of such focusing optical elements that form a row arrangement at least along an axis, or a number of rows of such focusing elements form an array arrangement in order to increase the measuring sensitivity. The optical axes and, consequently, also all the focusing optical elements should in this case be arranged equidistantly from one another.

It is preferred, furthermore, for these focusing optical elements to be identically fashioned with reference to their optical properties, something which holds true for their focal length, in particular.

The focusing optical elements should be arranged, taking account of their respective focal length, at an optimized distance from the respective reflecting surface so that even slight changes in distance can be reflected in measured light intensities at the optical detector, that vary significantly.

Thus, a mean distance between focusing optical elements and reflecting surface can be selected such that said mean distance corresponds to the respective focal point plane of the focusing optical elements.

However, in the case of the arrangement according to the invention, the distance between the plane in which the focusing optical elements are arranged and the collimating optical element should also be kept constant.

There is an advantageous outcome when the respective convex surfaces of the focusing optical elements, which can preferably be constructed as cylindrical lenses, are asphericly curved. Such an aspheric curve of the convex surface of the collimating optical element is likewise advantageous. The collimating optical element can be constructed as the plano-convex lens, the convexly curved surface pointing in the direction of the reflecting surface whose distance is to be determined.

It is possible to use a single optical fiber to direct light onto the reflecting surface, and to direct light reflected therefrom onto at least one optical detector via this one optical fiber. A suitable coupler to the light source and to the detector is to be used for this purpose.

If the reflecting surface is arranged at a desired or reference distance in the case of which it is arranged in the focal point plane of the reflecting optical elements, the light directed from the optical fiber onto the reflecting surface and reflected therefrom is imaged completely into this optical fiber, and a maximum intensity can be detected. If the distance of the reflecting surface increases or decreases, there is no complete imaging, and the intensity reaching the optical detector via the optical fiber is correspondingly reduced such that the detectable reduction in light intensity is a measure of the varied distance.

If at least one further optical fiber that can direct light onto a further optical detector from the reflecting surface is arranged in the vicinity of the designated one optical fiber, the light intensity detectable with the aid of this optical detector is increased in conjunction with a varying distance, as soon as the reflecting surface is arranged outside the focal point plane of the reflecting optical element, that is to say has been moved. A simultaneous reduction in the light intensity that is directed onto the corresponding optical detector with the aid of the other optical fiber via the optical coupler/fiber brancher takes place.

It is also possible in the case of the arrangement according to the invention to use at least two optical fibers that are arranged outside (next to) the optical axis of at least the collimating optical element. It is possible in this case to dispense with an optical coupler/fiber brancher on optical fibers. In this case, an optical fiber merely directs light onto the reflecting surface, and light reflected therefrom is coupled into the one or further additional optical fiber(s) via the abovementioned optical element, and the respective light intensity varying as a function of distance is detected by means of optical detectors.

Cylindrical lenses should be used as reflecting optical elements in this case, in particular.

In the arrangement according to the invention, the end faces of optical fibers can be aligned orthogonal to the optical axis of the respective collimating optical element, something which can be valid for the at least one optical fiber for irradiating the reflecting surface, and also for light reflected from this surface.

In addition to the possibility of aligning optical fibers parallel to the optical axis of the collimating optical element, at least in a region in which light is coupled out of and into the latter, there is a possibility of aligning these optical fibers at an obliquely inclined angle with reference to the optical axis, the angle of inclination possibly being in a range between 2° and 8°. It is thus possible, for example, to undertake an adaptation, in particular, of at least one optical fiber for reflected light to the beam shaping that can be achieved by means of the focusing optical element, such that an orthogonal alignment of the end face can be achieved in order to couple in reflected light to the plane of curvature of the focusing element.

However, there is also the possibility of an offset arrangement of the optical fibers used for irradiation of the reflecting surface and/or for light reflected there from with reference to the optical axis of the collimating optical element.

In a development of the arrangement according to the invention, a transmission grating is constructed on an optical fiber for irradiating the reflecting surface at the end face at which this light is coupled out.

In this embodiment, it is possible to exert a locally targeted influence on an irradiation of the reflecting surface with reference to the respective arrangement of focusing elements.

In the case of the arrangement according to the invention, LEDs known per se, other incoherent light sources or laser diodes can be used as light sources, it being possible as a rule to dispense with polarization or optical filtering.

As already mentioned at the beginning, the arrangement according to the invention can advantageously be used on vibrating systems. Thus, it is possible to construct the reflecting surface as part of a pellicle, or to arrange it in a fashion fixed on such a pellicle, so that changes in distance occurring because of vibrations can be detected when such a pellicle vibrates.

Thus, by contrast with the known solutions of the prior art, in the case of the arrangement according to the invention the imaging optic is formed from a collimating optical element and a plurality of focusing optical elements, the latter requiring to be used in the form of an array arrangement.

This gives rise to further possibilities for increasing the measuring sensitivity. Thus, this can be influenced by increasing the numerical apertures of the individual focusing elements used, and also by appropriate reduction in the focal length of these focusing elements. The two designated parameters can, however, exert an appropriate positive influence independently of one another. Particularly by splitting the light beam that is applied to the reflecting surface by means of the plurality of focusing optical elements, the focal length of the focusing optical elements can be reduced very substantially in conjunction with small spacings of the optical axes of these focusing optical elements (small array pitches), without the divergence in the image space increasing, something which is true, in particular, of the retroreflected light component.

The invention is to be explained in more detail below in an exemplary fashion.

Figure 1:
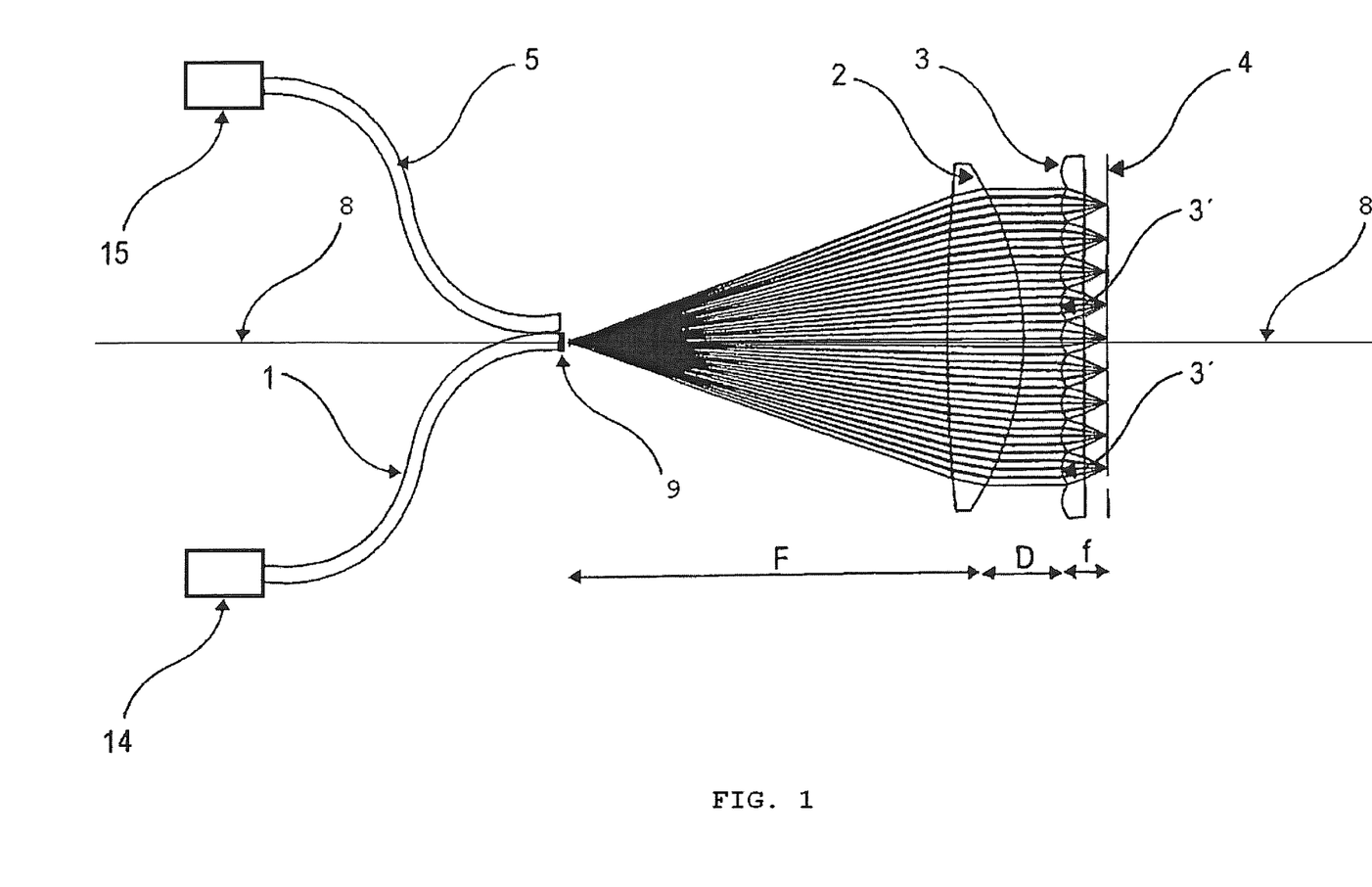
FIG. 1 shows a schematic of an example of an arrangement according to the invention having two optical fibers.

An example of an arrangement according to the invention is shown in FIG. 1 schematically.

Here, light from a light source 14 is coupled out via an optical fiber 1. A transmission grating 9 is constructed on the optical fiber 1 for irradiating the reflecting surface at the end face at which this light is coupled out and directed divergently onto a collimating optical element 2, having an optical axis 8. The parallel light beam then strikes an array arrangement 3 that is formed from focusing optical elements 3' arranged equidistantly from one another. The light beam from each of the focusing optical elements 3' is directed in this case in the direction of a reflecting surface 4 that is a component of a pellicle 16, or is arranged in a fixed fashion on such a pellicle 16.

Here, the focusing optical elements 3' are arranged at a distance from the reflecting surface 4 that is at least in the vicinity of their focal length f.

Because of respective reflections, the individual images are coupled into the end face of the optical fiber 5 and directed onto an optical detector 15 connected to this optical fiber 5, when the reflecting surface 4 is arranged outside the focal point plane of the optical elements 3'. If the reflecting surface 4 is arranged in the focal point plane of the optical elements 3', the entire light is retroreflected from the reflecting surface 4 into the optical fiber 1.

The intensity of the light reflected and coupled into the optical fiber 5 is detected with the aid of this optical detector, and can be used to determine the respective distance of the reflecting surface 4 or possibly occurring changes in distance.

The influencing variables in this case are the focal length F of the collimating optical element 2, the distance D between a collimating optical element 2 and the array arrangement 3 of focusing optical elements 3' and a focal length f thereof, which is smaller than the focal length F of the collimating optical element 2.

In the case where the distance between the array arrangement 3 and the reflecting surface 4 corresponds to the focal length f of the focusing optical elements 3', and the distance of the optical fiber 1 from the collimating optical element 2 corresponds to the focal length F of the optical element 2, the core of the optical fiber 1 can be imaged right way up onto itself at the scale of 1:1.

However, if the distance of the reflecting surface 4 changes, depending on the change in distance that respectively occurs, imaging is performed in a more or less defocused fashion such that only a portion of the light can be coupled back into the optical fiber 1, and another portion of the light can be coupled into the optical fiber 5 and detected with the aid of the optical detector.

In a particular case, specifically when the distance D=F+f is valid, the scattering circle radius R of such an arrangement is described as follows for a punctiform object in paraxial approximation:

$$R = 2 \cdot \frac{F}{f} \cdot NA \cdot \delta$$

Here, NA is a numerical aperture of the focusing optical elements 3' of the array arrangement 3, and δ is the deflection of the reflecting surface from the nominal distance from the array arrangement 3.

The measuring sensitivity can be achieved here by increasing the numerical apertures and/or reducing the focal length of the focusing optical elements 3', as well as also by increasing the focal length F of the collimating optical element.

By contrast with the illustration of FIG. 1, however, there is also the possibility of using only one optical fiber 1 from which light from a light source is coupled out, and of directing it onto the reflecting surface 4 via the imaging optics formed from collimating optical element 2 and array arrangement 3, and coupling light retroreflected therefrom into this optical fiber. Such an optical fiber is connected in this case to a fiber brancher/optical coupler such that retroreflected light can impinge on the optical detector.

Figure 2:
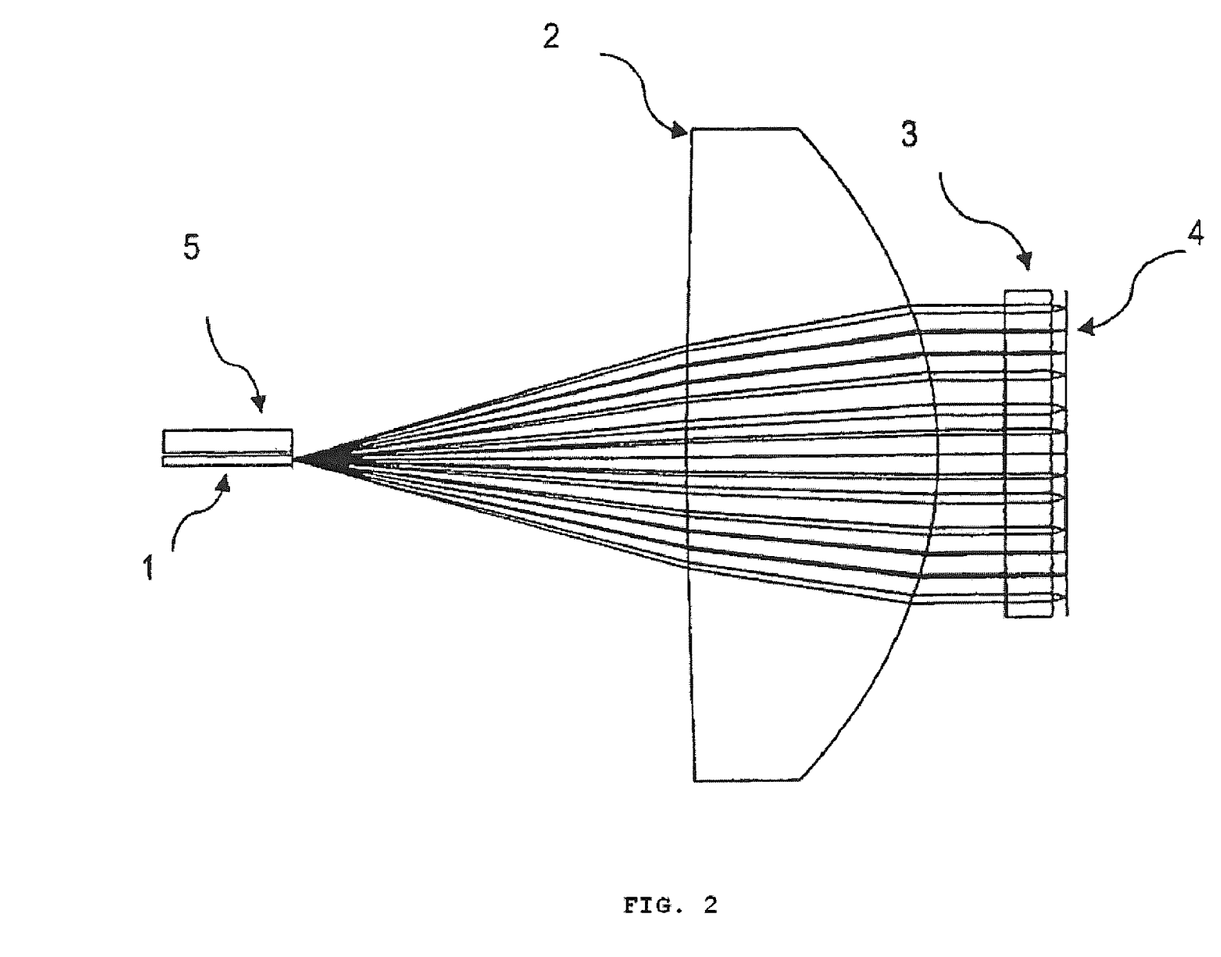
FIG. 2 shows an arrangement of two optical fibers, using an example of an arrangement according to the invention.

FIG. 2 shows an example, likewise in schematic form, in the case of which use has been made of an optical fiber 1 as graded index multimode fiber with a core diameter of 0.1 mm and a numerical aperture of 0.25.

The light beam coupled out of this optical fiber 1 reaches divergently the plano-convex lens, which forms a collimating optical element 2 and whose convex surface is aspherically curved. The plano-convex lens is a commercial available aspheric lens with the designation GELTECH 350240.

The array arrangement 3 is constructed from cylindrical lenses as focusing optical elements 3' with a spacing of 0.15 mm of their optical axes from one another in each case, and with a focal length of 0.2 mm. The individual cylindrical lenses have a numerical aperture of 0.35. The convexly curved surfaces of the cylindrical lenses are aligned here as focusing optical elements 3' in the direction of the reflecting surface 4 in this example. Their curvature is likewise of aspheric construction with a conical constant of −2.3.

Light reflected from the reflecting surface 4 passes this imaging optics in the reverse direction. Thus, reflected light can be coupled into the decentric optical fiber 5, which is arranged at a spacing of 0.2 mm from the optical fiber 1, and has a core diameter of 0.2 mm with a numerical aperture of 0.37.

If the distance from the reflecting surface 4 changes, more or less light is coupled into the optical fiber 5 as a function of the change in distance respectively occurring.

Figure 3:
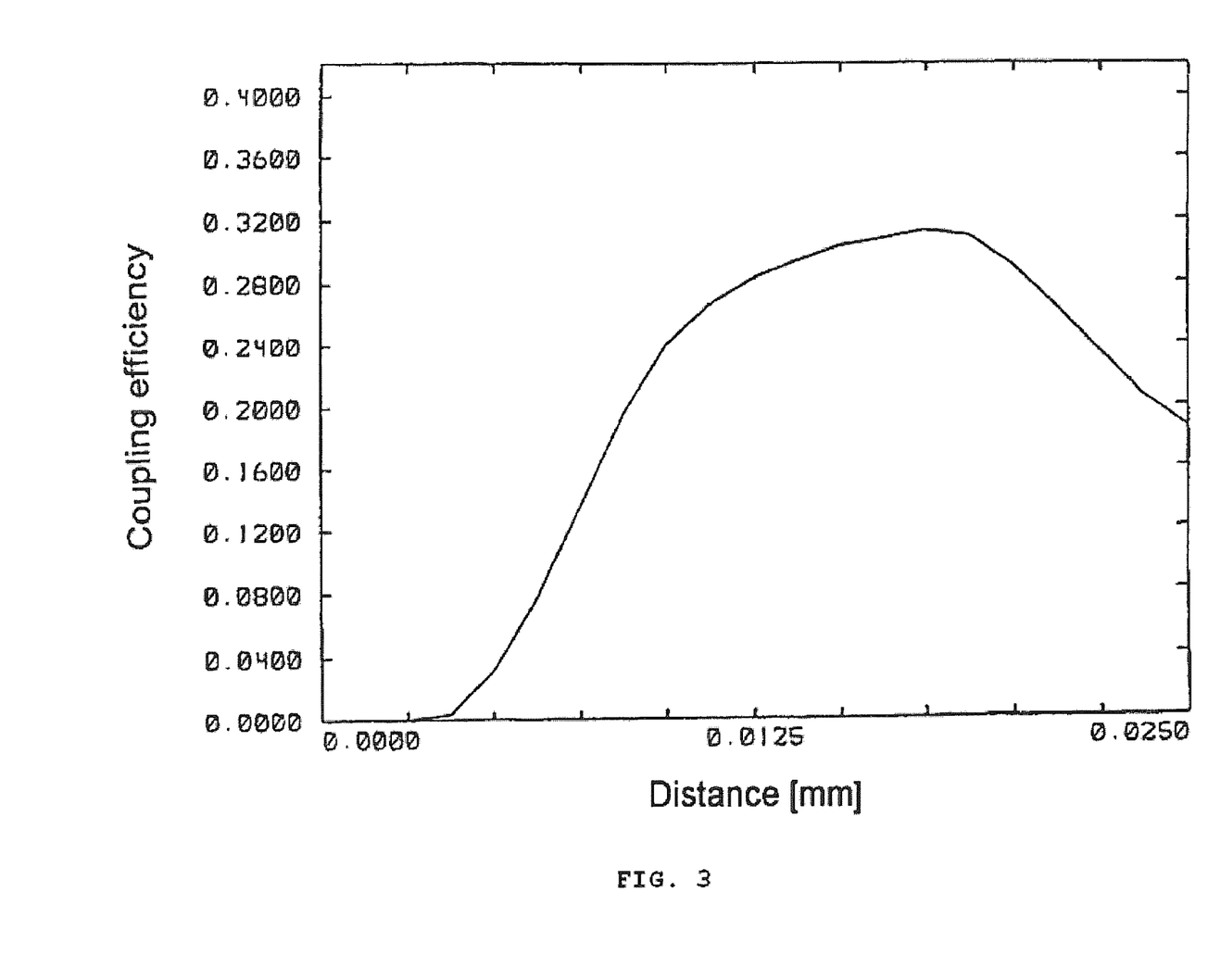
FIG. 3 shows a diagram of coupling efficiency varying as a function of a varying distance of a reflecting surface.

A specific dependence, determined by ray tracing, of the light intensity coupled into the optical fiber 5 on the respective deflection/respective distance of the reflecting surface 4 from a desired distance of 0.2 mm is illustrated in FIG. 3 in the form of a diagram.

It may be recognized in this diagram that a substantially increased gradient of the varying light intensity as a consequence of the achievable coupling efficiency owing to the imaging optics used in accordance with the invention is to be recorded in a linear operating range starting from approximately 5 to 10 μm, something which is reflected in an increased measuring sensitivity.

Figure 4:
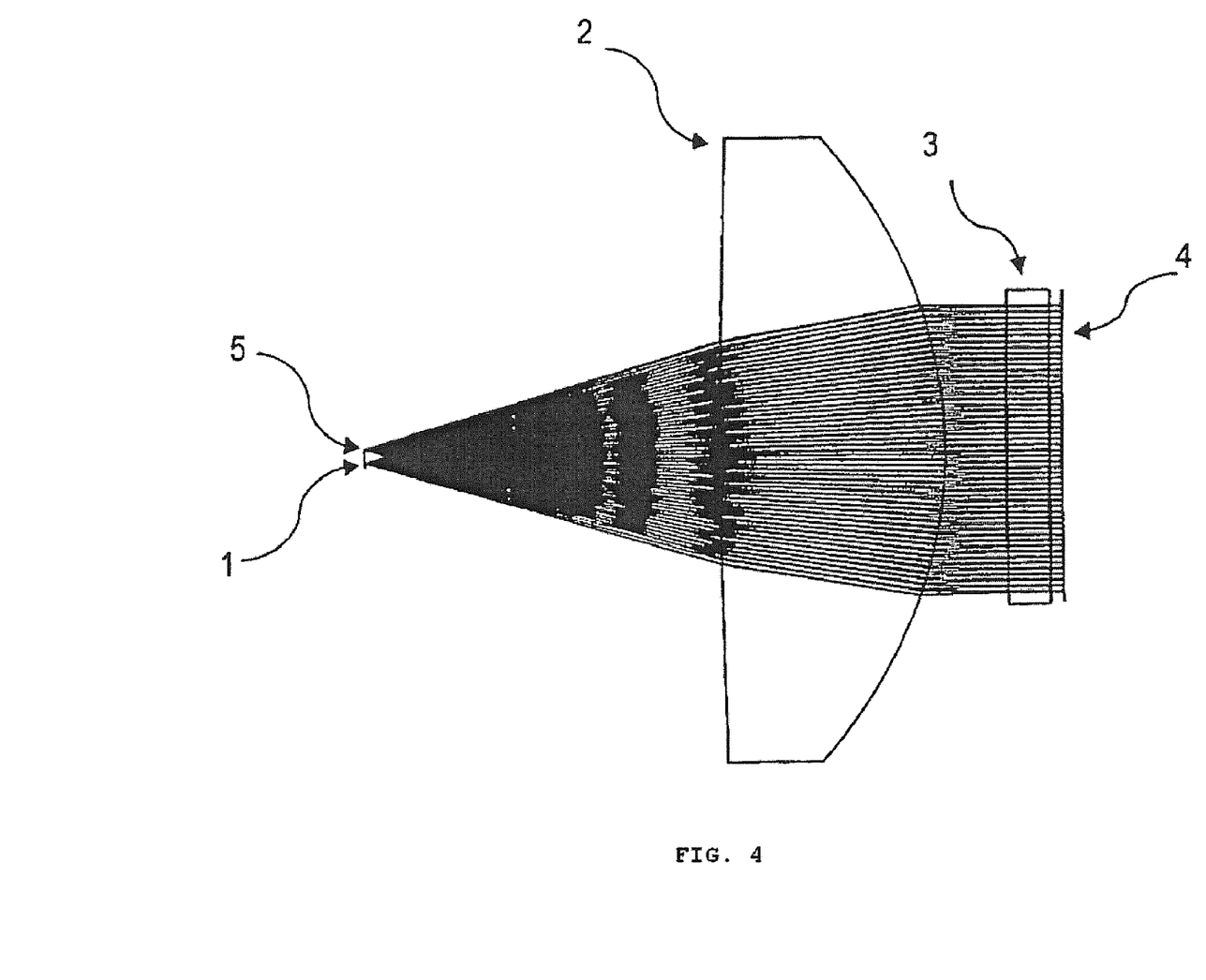
FIG. 4 shows an example of an arrangement according to the invention having two optical fibers decentered symmetrically about an optical axis.

The aim of FIG. 4 is to show a possible embodiment for which two optical fibers 1 and 5 are decentered around the optical axis of the collimating optical element 2. It is possible thereby to achieve the possibility of coupling an increased component of the light reflected from the reflecting surface 4 into the optical fiber 5, which reference to the optical axis of the collimating optical element, if the reflecting surface 4 is located at a prescribable desired distance, either tilting the reflecting surface 4 or by decentering the optical fiber 5 from which light is coupled out for irradiating the reflecting surface 4. Thus, a change in distance of the reflecting surface also effects a reduction in the intensity coupled into the optical fiber 5 and detectable with the aid of the optical detector.

Figure 5:
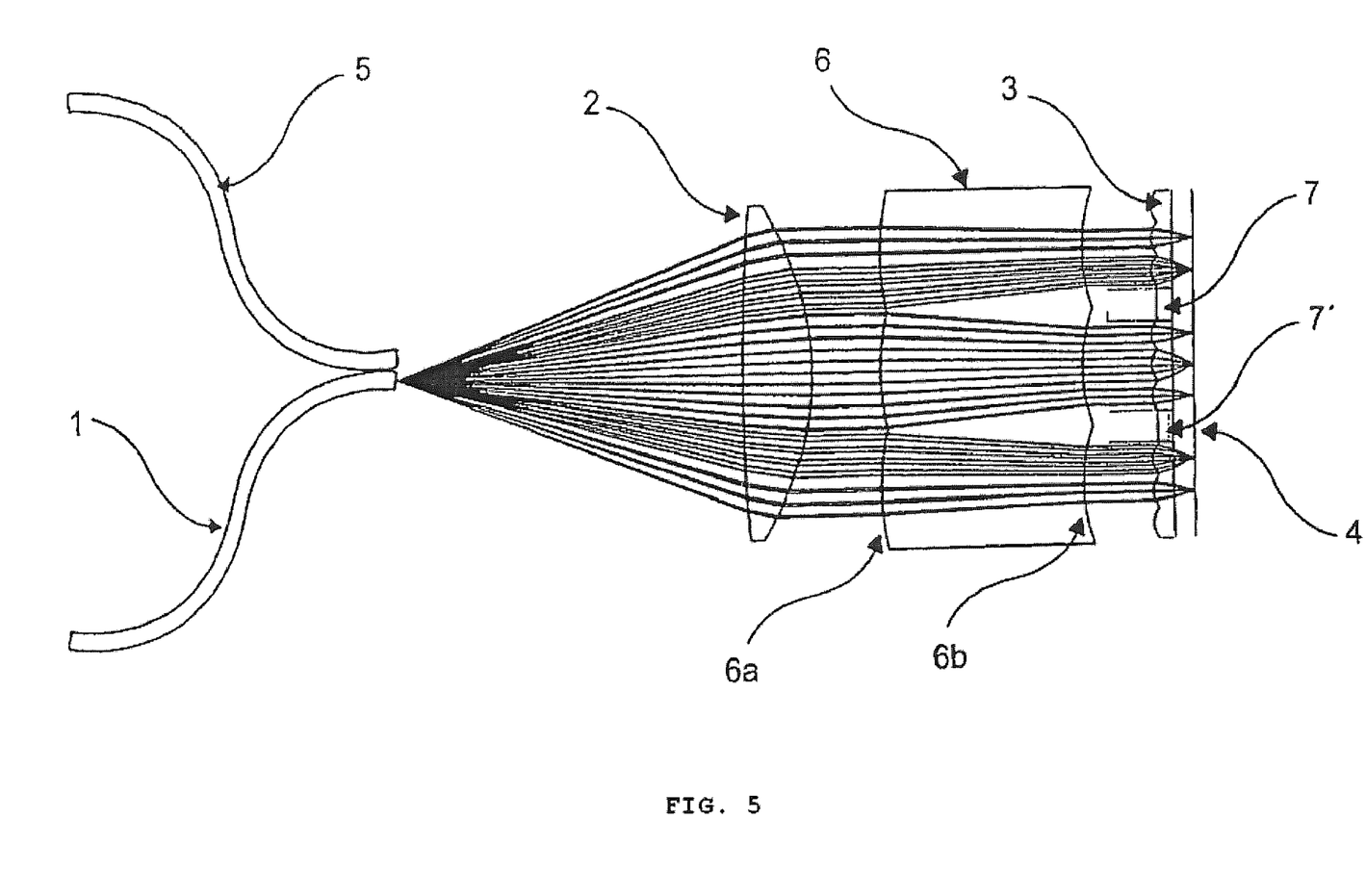
FIG. 5 shows a further example having an additional beam-shaping optical element.
Figure 7:
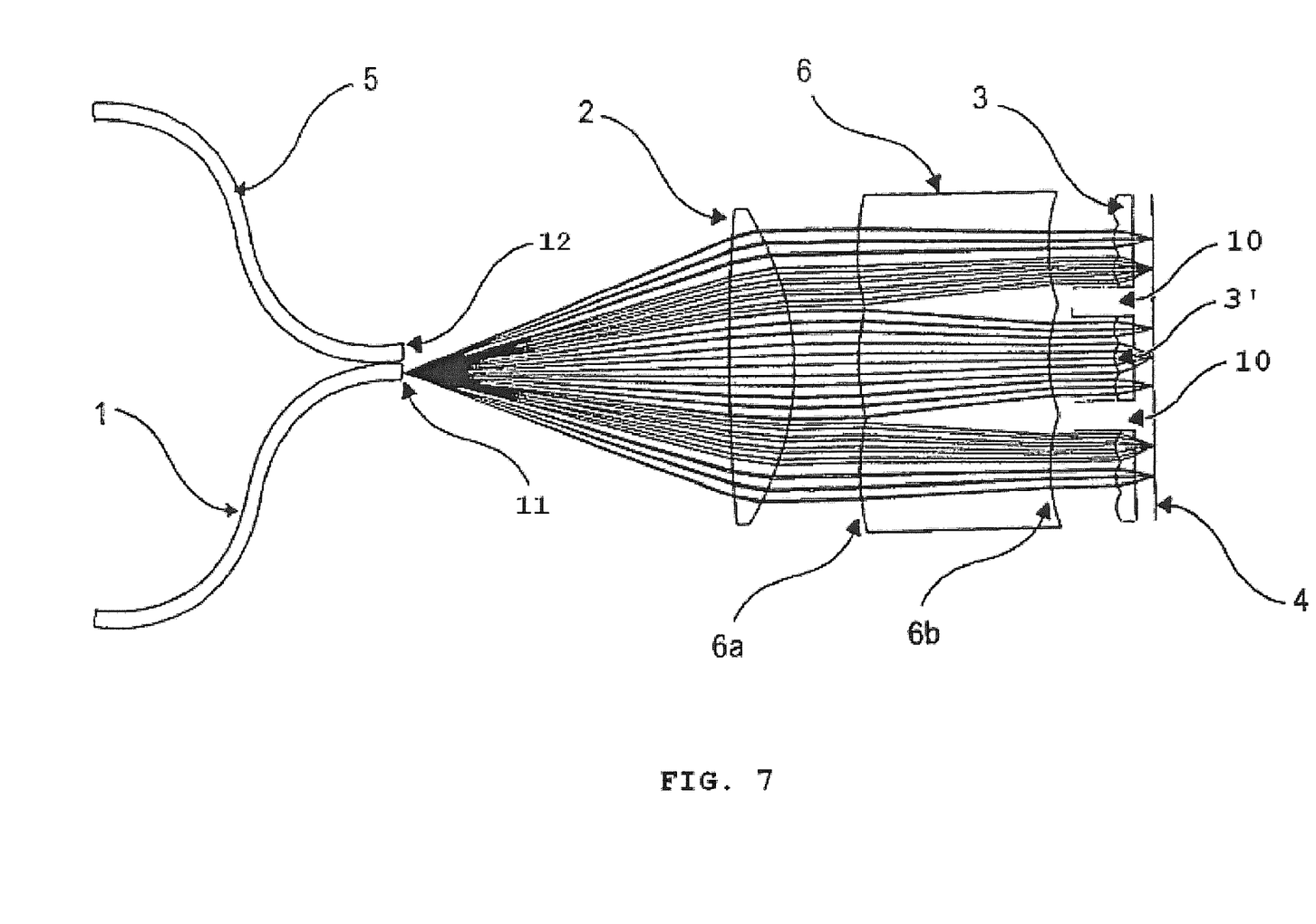
FIG. 7 shows a further example having an additional beam-shaping optical element, and free spaces between the focusing optical elements.
Figure 8A:
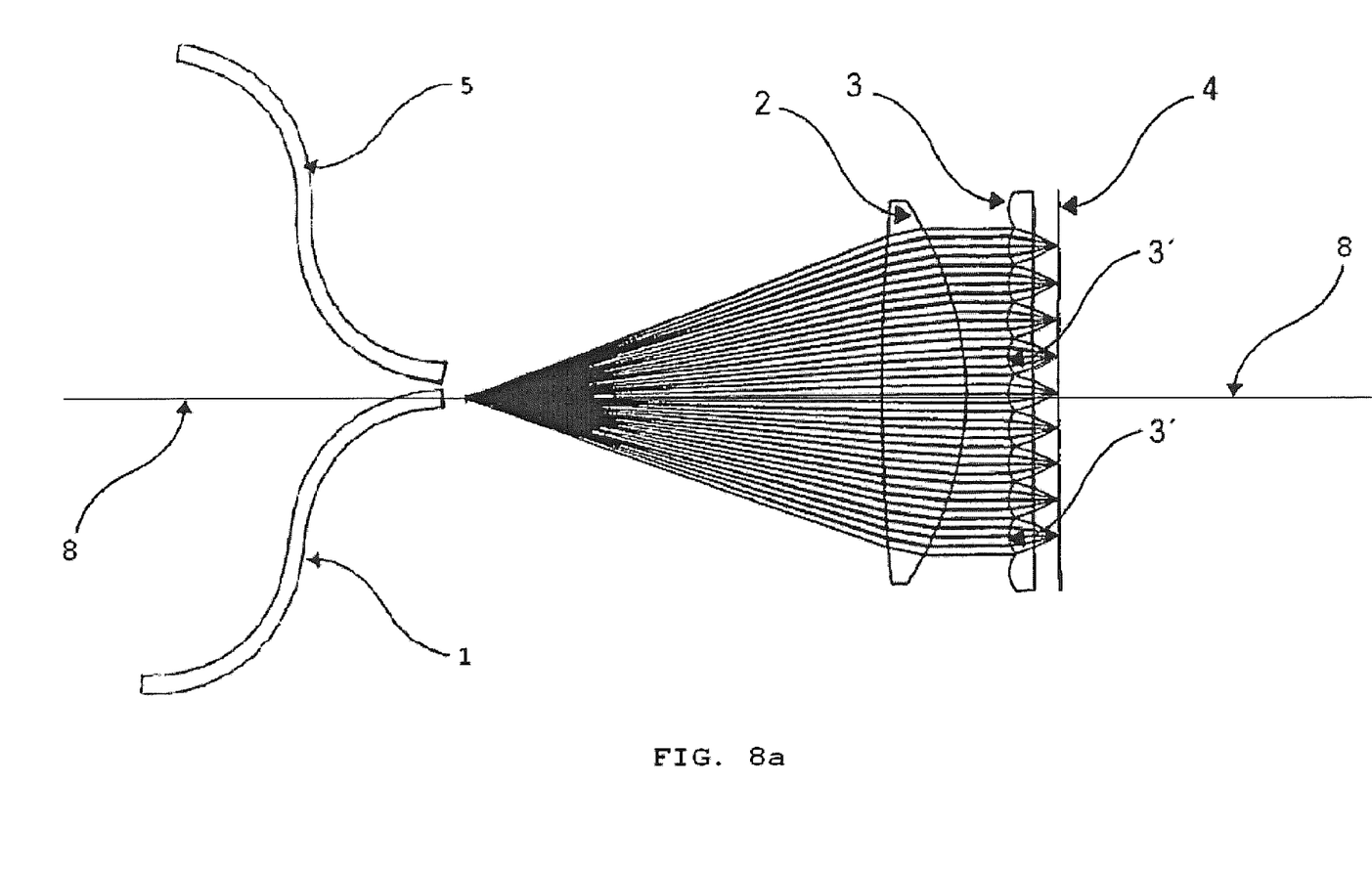
FIGS. 8a-d show schematics of examples of various arrangements according to the invention having two optical fibers, aligned at obliquely inclined angles with reference to the optical axis of the collimating optical element.
Figure 8B:
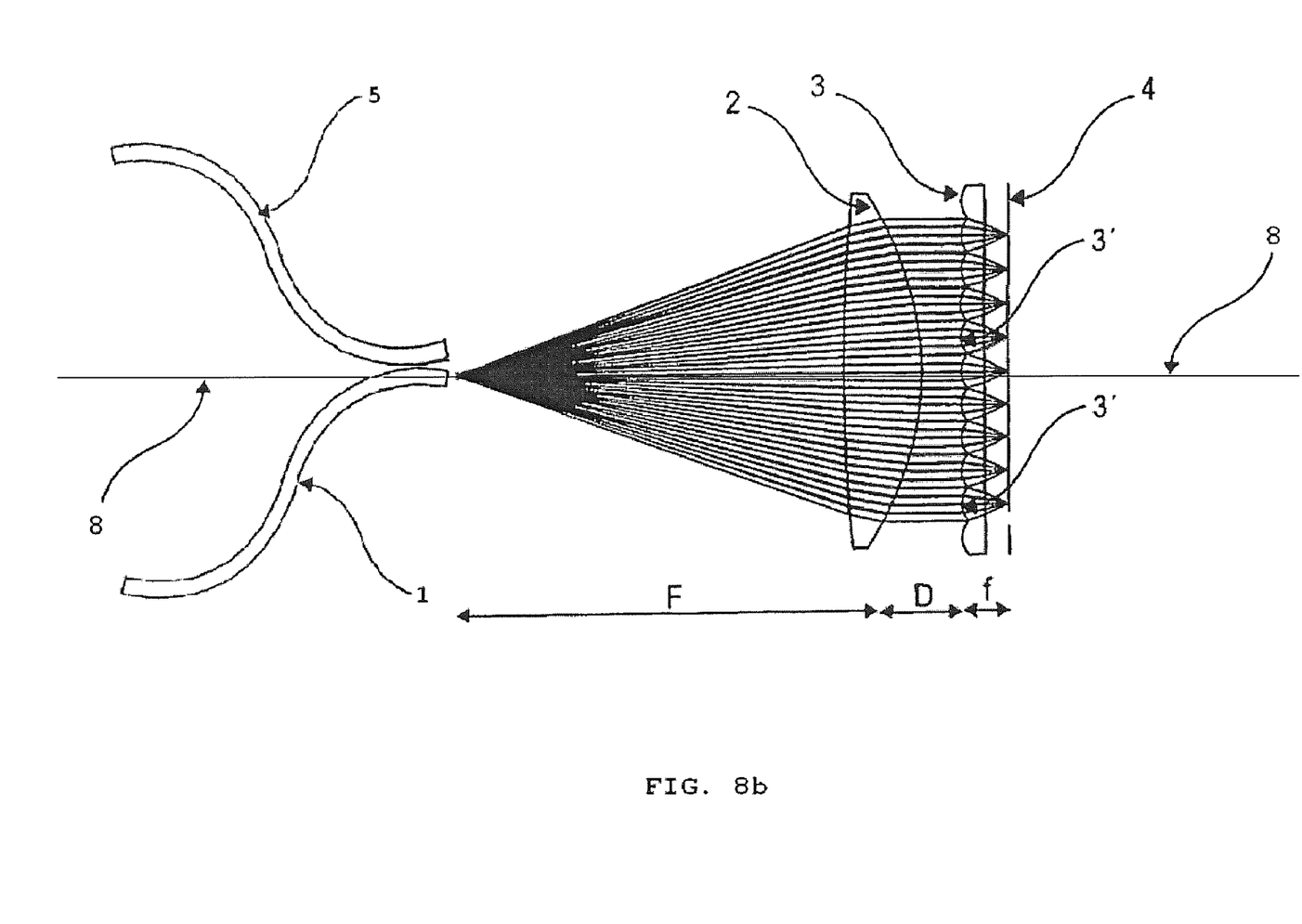
Figure 8C:
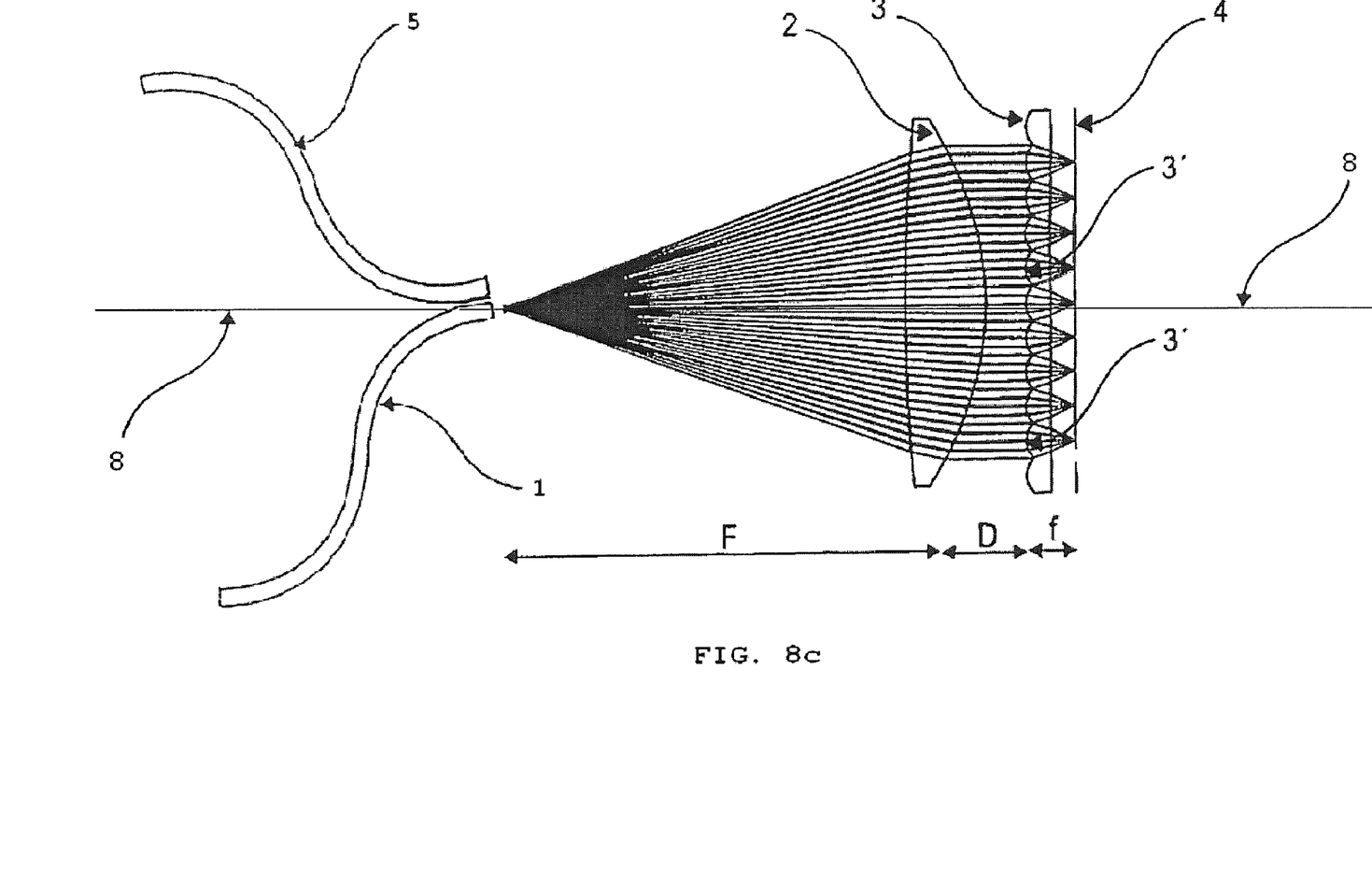
Figure 8D:
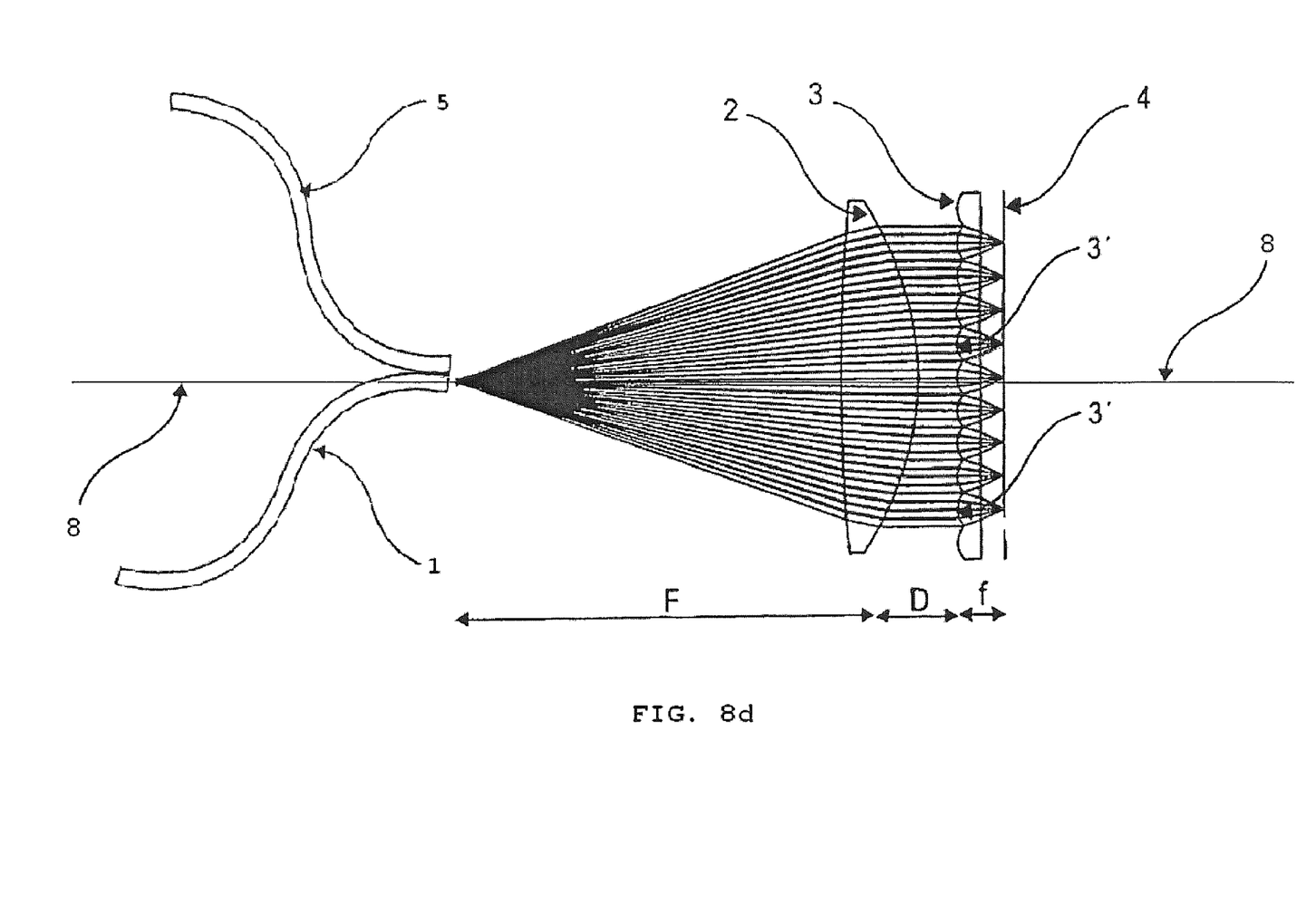

In the case of the example of an arrangement according to the invention shown in FIG. 5, through holes 7 and 7' are constructed between focusing optical elements 3' that are here as a component of an array arrangement 3. As illustrated in FIG. 7, the focusing optical elements 3' can also be arranged at distances from one another such that free spaces remain between them.

A substantial improvement in the frequency of response can be achieved with the aid of such a construction of an arrangement according to the invention, since it is possible thereby to achieve a pressure equalization in the event of changes in distance of the reflecting surface 4. In particular, since the distances between reflecting surface 4 and the focusing optical elements 3' are slight, in particular in the case of an array arrangement 3, the air cushion present therebetween can have a damping effect. This disadvantage can be eliminated by means of the through holes 7, 7' or appropriate free spaces.

In the case of the example shown in FIG. 5, a beam-shaping optical element 6 is additionally present between the collimating optical element 2 and the focusing optical elements 3', that is to say, here, the array arrangement 3.

Light losses can be compensated with the aid of this beam-shaping optical element 6, since thus only areas of the array arrangement 3 on which focusing optical elements 3' are arranged are illuminated, and light beams are guided onto these regions in a targeted fashion, and consequently regions with through holes 7, 7' are not illuminated.

Figure 6:
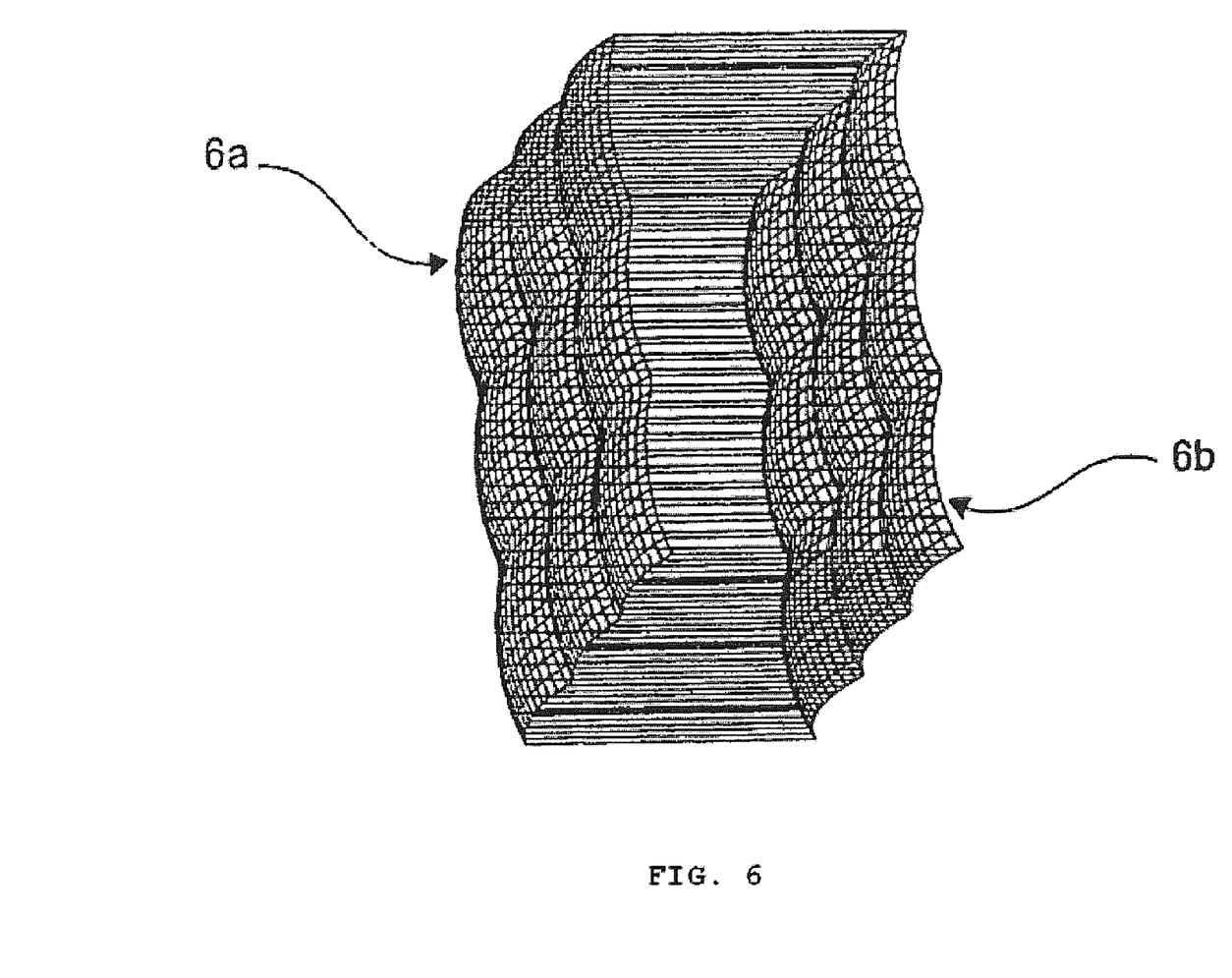
FIG. 6 shows a three-dimensional illustration of the beam-shaping optical element additionally used in the example according to FIG. 5.

In addition to the beam-shaping element 6 shown in the example in FIGS. 5 and 6, one or else a number of diffractive or refractive optical elements can also be used. However, there is also the possibility (not illustrated) of integrating beam-shaping elements into the collimating optical element 2 so that the additional element 6, could be dispensed with.

A telescope array arrangement is used in the case of the example shown.

The three-dimensional perspective illustration of FIG. 6 makes clear that the beam-shaping optical element 6 on two diametrically opposite surfaces quadratically convexly cambered, and on the opposite side concavely cambered surface regions 6a and 6b are constructed in complementary fashion, which are separated from one another by meniscuses in each case.

Thus, the side of the beam-shaping optical element 6 having the convexly cambered surfaces 6a is arranged pointing in the direction of the collimating optical element 2, and the side having the concavely cambered surface regions 6b is arranged pointing in the direction of the focusing optical elements 3'.

The cambered surface regions can be arranged and dimensioned in this case such that only focusing optical elements 3' are irradiated and regions in which through holes 7, 7' are arranged are not irradiated.

In FIG. 7, free spaces 10 are present between the focusing optical elements 3'. FIG. 7 also illustrates an end face 11 of a first optical fiber positioned adjacent to an end face 12 of a second optical.

In each of FIGS. 8a, 8b, 8c, and 8d optical fiber 1 is aligned at an obliquely inclined angle with reference to the optical axis 8 of the collimating optical element 2. Likewise, optical fiber 5 is aligned at an obliquely inclined angle with reference to the optical axis 8 of the collimating optical element 2.

Figure 9:
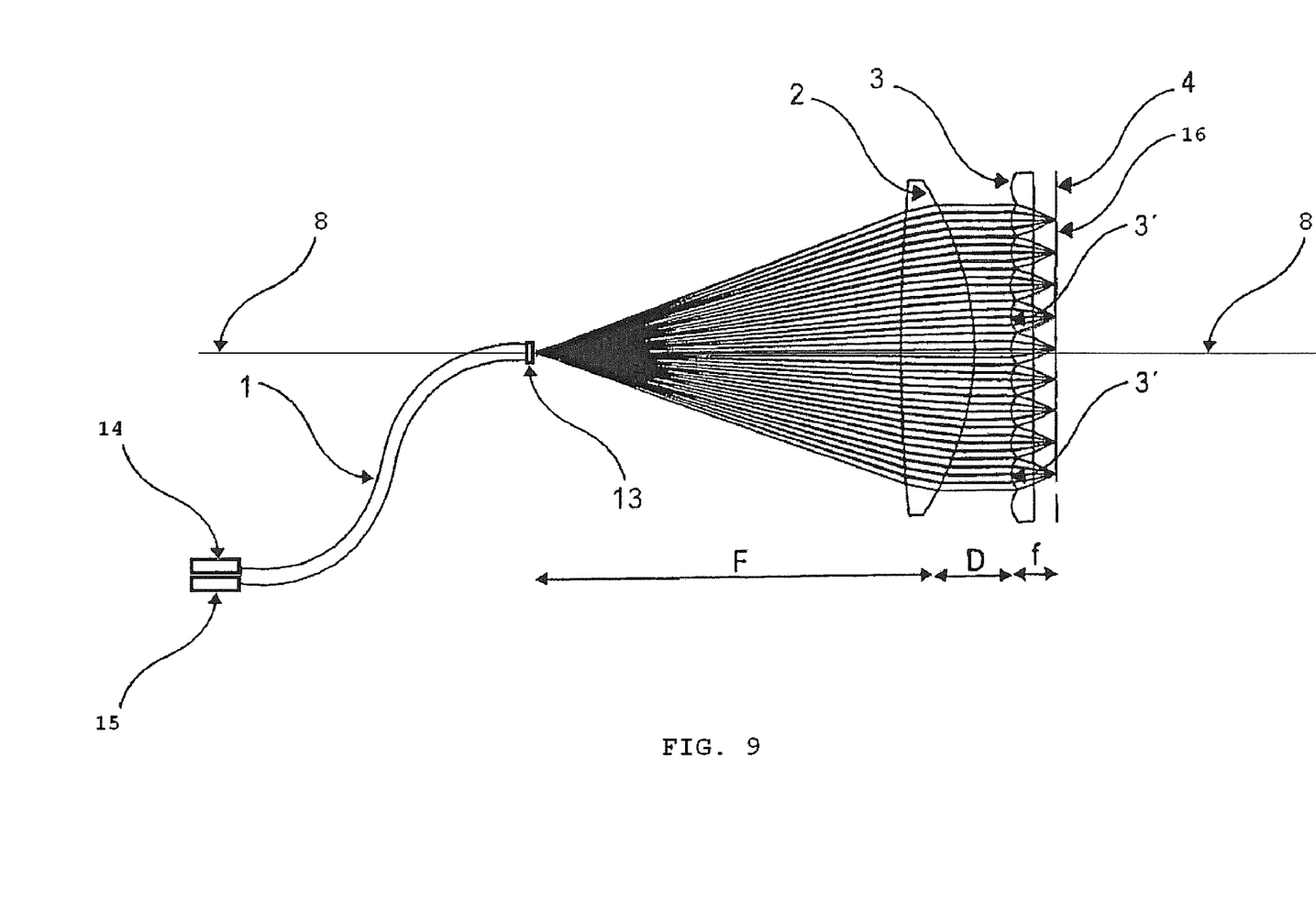
FIG. 9 shows a further example having a fiber brancher/backward coupler connected to the first optical fiber, such that light reflected from the reflecting surface can be coupled into the first optical fiber and can impinge on the optical detector.

In FIG. 9 a fiber brancher/backward coupler 13 is connected to the first optical fiber 1. Light from the LED or laser diode light source 14 passes through the first optical fiber 1. The light is then reflected from the reflecting surface 4 and coupled through the fiber brancher/backward coupler 13 into the first optical fiber 1 to impinge on the optical detector 15.

The invention claimed is:

1. An apparatus for optically determining distance, wherein the apparatus comprises:
   (i) at least one collimating optical element,
      wherein the at least one collimating optical element has an optical axis; and
   (ii) at least two focusing optical elements,
      wherein each of the at least two focusing optical elements has an optical axis,
      wherein the optical axes of the focusing optical elements are aligned parallel to the optical axis of the at least one collimating optical element, and
      wherein at least two optical axes of the focusing optical elements are not collinear;
   wherein light is directed through the at least one collimating optical element that collimates in the direction of a reflecting surface, through the at least two focusing optical elements that focus in the direction of the reflecting surface, and onto the reflecting surface that reflects the light, and
   wherein the light is directed through a first optical fiber, through the at least one collimating optical element that collimates in the direction of the reflecting surface, through the at least two focusing optical elements that focus in the direction of the reflecting surface, onto the reflecting surface that reflects the light through the first optical fiber to an optical detector, or optionally through a second optical fiber to an optical detector, and
   wherein the detector is a detector for measuring the intensity of the reflected light from the reflecting surface.

2. The apparatus as claimed in claim 1, wherein several focusing optical elements form a row arrangement along an axis or form an array arrangement in a number of rows.

3. The apparatus as claimed in claim 1, wherein the focusing optical elements are arranged equidistantly from one another.

4. The apparatus as claimed in claim 1, wherein the focusing optical elements are arranged at a constant distance from the collimating optical element.

5. The apparatus as claimed in claim 1, wherein the focusing optical elements are constructed as cylindrical lenses.

6. The apparatus as claimed in claim 1, wherein the convex surfaces of the focusing optical elements are aspherically curved.

7. The apparatus as claimed in claim 1, wherein the collimating optical element is a plano-convex optical lens.

8. The apparatus as claimed in claim 1, wherein the convex surface of the collimating optical element is aspherically curved.

9. The apparatus as claimed in claim 1 wherein light is directed through a first optical fiber, through the at least one collimating optical element that collimates in the direction of the reflecting surface, through the at least two focusing optical elements that focus in the direction of the reflecting surface, onto the reflecting surface that reflects the light through the first optical fiber to an optical detector, or optionally through a second optical fiber to an optical detector, and wherein an end face of at least one second optical fiber, into which the reflected light can be coupled, is arranged immediately next to an end face of the first optical fiber from which light from a light source exits.

10. The apparatus as claimed in claim 1, wherein light is directed through a first optical fiber, through the at least one collimating optical element that collimates in the direction of the reflecting surface, through the at least two focusing optical elements that focus in the direction of the reflecting surface, onto the reflecting surface that reflects the light through the first optical fiber to an optical detector, or optionally through a second optical fiber to an optical detector, and wherein the appartus further comprises a fiber brancher/backward coupler connected to the first optical fiber, such that light reflected from the reflecting surface can be coupled into the first optical fiber and can impinge on the optical detector.

11. The apparatus as claimed in claim 1, wherein light is directed through a first optical fiber, through the at least one collimating optical element that collimates in the direction of the reflecting surface, through the at least two focusing optical elements that focus in the direction of the reflecting surface, onto the reflecting surface that reflects the light through the first optical fiber to an optical detector, or optionally through a second optical fiber to an optical detector, and wherein the end face(s) of the first optical fiber and/or the at least one further optical fiber is/are aligned orthogonal to the optical axis of the collimating optical element.

12. The apparatus as claimed in claim 1, wherein light is directed through a first optical fiber, through the at least one collimating optical element that collimates in the direction of the reflecting surface, through the at least two focusing optical elements that focus in the direction of the reflecting surface, onto the reflecting surface that reflects the light through the first optical fiber to an optical detector, or optionally through a second optical fiber to an optical detector, and wherein the first optical fiber and/or the at least one further optical fiber is/are in each case aligned at an obliquely inclined angle with reference to the optical axis of the collimating optical element.

13. The apparatus as claimed in claim 1, wherein light is directed through a first optical fiber, through the at least one collimating optical element that collimates in the direction of the reflecting surface, through the at least two focusing optical elements that focus in the direction of the reflecting surface, onto the reflecting surface that reflects the light through the first optical fiber to an optical detector, or optionally through a second optical fiber to an optical detector, and wherein the first optical fiber and/or the at least one further optical fiber is/are arranged offset from the optical axis of the collimating optical element.

14. The apparatus as claimed in claim 1, wherein light is directed through a first optical fiber, through the at least one collimating optical element that collimates in the direction of the reflecting surface, through the at least two focusing optical elements that focus in the direction of the reflecting surface, onto the reflecting surface that reflects the light through the first optical fiber to an optical detector, or optionally through a second optical fiber to an optical detector, and wherein a transmission grating is constructed on the end face of the first optical fiber.

15. The apparatus as claimed in claim 1, wherein the light originates from a light source, and wherein the light source is an LED or a laser diode.

16. The apparatus as claimed in claim 1, wherein the reflecting surface is a part of a pellicle or is arranged on a pellicle.

17. The apparatus as claimed in claim 1, wherein free spaces are present between focusing optical elements or through holes are constructed.

18. The apparatus as claimed in claim 1, wherein at least one further beam-shaping optical element is arranged between a collimating optical element and focusing optical elements, or beam-shaping elements are integrated in the collimating optical element.

19. The apparatus as claimed in claim 18, wherein the beam-shaping optical element is a telescope array arrangement.

20. The apparatus as claimed in claim 18, wherein the beam-shaping optical element(s) is/are diffractive or refractive optical elements.

21. The apparatus as claimed in claim 1, wherein the apparatus forms an optical microphone.

* * * * *